United States Patent [19]

Kawabata et al.

[11] 4,442,140

[45] Apr. 10, 1984

[54] AQUEOUS COMPOSITION FOR THE PROTECTION OF PAINT SURFACES

[75] Inventors: Nobuaki Kawabata; Nobuo Yokoyama, both of Yokohama; Yoshihiko Araki, Tokyo, all of Japan

[73] Assignee: Nippon Oil Co. Ltd., Japan

[21] Appl. No.: 371,829

[22] Filed: Apr. 26, 1982

[30] Foreign Application Priority Data

May 6, 1981 [JP] Japan .................................. 56-66840

[51] Int. Cl.$^3$ ...................... B65B 33/00; C08L 91/06
[52] U.S. Cl. .................................. 427/154; 106/271; 106/272; 427/353; 427/377
[58] Field of Search ............... 106/271, 272, 2, 308 Q, 106/306; 427/154, 353, 377

[56] References Cited

U.S. PATENT DOCUMENTS 3,985,932 10/1976 Porter .................................. 106/271
4,264,372 4/1981 Graves .................................. 106/306

FOREIGN PATENT DOCUMENTS 54-7303 4/1979 Japan .

OTHER PUBLICATIONS

Chem. Abst. 84: 181,715q, Fukuda et al., May 12, 1970.

Primary Examiner—Theodore Morris
Attorney, Agent, or Firm—McGlew and Tuttle

[57] ABSTRACT

An aqueous composition for the protection of paint surfaces comprises an aqueous emulsion containing as essential components (a) an oxygen-containing wax, (b) an emulsifying agent, (c) a fine powder of an inorganic material having a silicon content of not less than 23%, and (d) a fine powder of an inorganic or organic material substantially free of silicon.

23 Claims, No Drawings

AQUEOUS COMPOSITION FOR THE PROTECTION OF PAINT SURFACES

BACKGROUND OF THE INVENTION

1. Field of the Invention

This invention relates to aqueous compositions for the protection of paint surfaces. More particularly, it relates to an aqueous composition for the protection of such surfaces which is applied to automobiles, agricultural machinery, construction machinery, and other types of machinery and implements for the purpose of protecting their paint surfaces temporarily.

2. Description of the Prior Art

During the period of time extending from the shipment of commercial products such as automobiles and the like to their delivery to ultimate purchasers, their paint surfaces are often stained by exposure to weather, moisture, sunlight, air, dusts, bird droppings, and atmospheric contaminants such as smoke and the like. This results in an impairment of their commercial value. In recent years, a variety of paint surface protective agents have been developed in order to prevent commercial products from suffering such damage. Among the paint surface protective agents developed for this purpose are, for example, a dispersion of wax in a solvent (as disclosed in Japanese Patent Laid-Open No. 28534/'75), a strippable film-forming composition (as disclosed in Japanese Patent Publication No. 7303/'79) which can be stripped off after use, a dispersion of wax and solid powder in a solvent (as disclosed in Japanese Patent Laid-Open No. 149188/'76 or 62978/'80) which can be wiped off by hand, and an aqueous wax emulsion (as disclosed in Japanese Patent Publication No. 34030/'70).

The paint surface protective agents which are currently in wide use take the form of a dispersion of wax in a solvent or a dispersion of wax and solid powder in a solvent. They form a wax coating by evaporating the greater part of the solvent. The disadvantages of such solvent type compositions have recently been discussed from the viewpoint of environmental protection, resource saving, economy, safety and the like. Moreover, a dispersion of wax in a solvent cannot be removed with steam alone, so that the addition of a small amount of kerosene is required. In order to overcome this disadvantage, there has been proposed a dispersion of wax and solid powder in a solvent wherein the wax and the solid powder are homogeneously mixed to decrease the mechanical strength of the wax coating and thereby facilitate wiping-off of the wax coating. However, the wax coating so formed is defective in protective power. That is, it has the disadvantage of being liable to peel off at a touch and subject to attack by acid rainwater.

On the other hand, an aqueous wax emulsion contains no solvent and, therefore, eliminates the possibilities of environmental pollution and fire hazard. Unlike solvent type compositions, however, this aqueous composition involves a number of additional performance requirements typified by drying properties and dispersibility in water. Moreover, the protective coating formed thereby must be highly resistant to rainwater and moisture and, at the same time, easily removable after use. An aqueous composition which fully satisfies these conflicting performance requirements still remains to be developed.

SUMMARY OF THE INVENTION

It is an object of the present invention to provide an aqueous composition for the protection of paint surfaces which forms a tough coating resistant to rainwater, moisture, sunlight and atmospheric contaminants without using any solvent and which, after use, can readily be removed with hot water, steam and the like.

The above and other objects of the present invention are accomplished by an aqueous composition for the protection of paint surfaces which comprises an aqueous emulsion containing as essential components (a) 100 parts by weight of an oxygen-containing wax having an oxygen content of not less than 3.0% by weight and a melting point of 50° to 85° C., (b) less than 7 parts by weight of an emulsifying agent, (c) 10 to 1,000 parts by weight of a substantially white-colored fine powder of an inorganic material having a silicon content of not less than 23% by weight, and (d) 10 to 200 parts by weight of a white-colored fine powder of an inorganic or organic material substantially free of silicon.

DETAILED DESCRIPTION OF THE PREFERRED EMBODIMENTS

The component (a) used in the composition of the present invention is an oxygen-containing wax having an oxygen content of not less than 3.0% by weight, preferably not less than 5.0% by weight, and a melting point of 50° to 85° C. The term "oxygen content" as used herein refers to that determined by a modification of Unterzaucher's method (or a thermal conductivity method), and detailed information on this method of oxygen determination is found, for example, in an article by Robert Clumo (Mikrochimica Acta, 1968, 811). Oxygen-containing waxes having an oxygen content of not less than 3.0% by weight can be satisfactorily be emulsified with the aid of a small amount of emulsifying agent, so that no undue decrease in drying properties, water resistance or weather resistance is caused by the emulsifying agent. Moreover, suitable oxygen-containing waxes have a melting point in the range of 50° to 85° C. If a wax having a melting point lower than the aforesaid range is used, sagging or running of the coating occurs, while if a wax having a melting point higher than the aforesaid range is used, it becomes difficult to remove the coating with hot water.

Typical examples of the oxygen-containing waxes which can suitably be used as the component (a) in the composition of the present invention includes natural waxes such as carnauba wax, montan wax, rice bran wax, beeswax and Japan wax; synthetic waxes such as oxidized microcrystalline wax and oxidized paraffin wax; the products obtained by modifying the foregoing waxes through various reactions; maleinized waxes obtained by the addition reaction of a hydrocarbon wax with maleic anhydride and the like.

A preferred oxygen-containing wax suitable for use in the composition of the present invention is a product obtained by reacting 100 parts by weight of a hydrocarbon wax having a melting point of 50° to 85° C. with 3 to 25 parts by weight of an unsaturated polycarboxylic acid or an anhydride thereof. Detailed information on the method of making such an oxygen-containing wax is found, for example, in Japanese Patent Laid-Open No. 96094/'74 filed in the name of the present inventors.

A more preferred oxygen-containing wax suitable for use in the composition of the present invention is a product obtained by mixing 10 to 80 parts by weight of a petroleum fraction wax (I) having a melting point of 50° to 85° C. with 90 to 20 parts by weight of a polyolefin wax (II) having a melting point of 36° to 120° C., a number-average molecular weight of 310 to 1,000, and 5 to 50 double bonds per 1,000 carbon atoms and reacting 100 parts by weight of the resulting mixture with 3 to 25 parts by weight of an unsaturated polycarboxylic acid or an anhydride thereof under free radical-forming conditions. Detailed information on the method of making such an oxygen-containing wax is found, for example, in Japanese Patent Laid-Open No. 81306/'79 filed in the name of the present inventors.

Since oxygen-containing waxes as defined above are excellent in emulsifiability, they require a smaller amount of emulsifying agent for the preparation of an aqueous composition than other petroleum fraction waxes do. Accordingly, no undue decrease in water resistance, drying properties, weather resistance or the like is caused by the emulsifying agent. Moreover, they have a relatively low melting point and show no adhesive properties, so that protective coatings containing them can readily be removed by means of a hot water cleaner and the like. On the other hand, petroleum fraction waxes such as paraffin wax, microcrystalline wax and the like can be used in solvent type compositions without any difficulty. However, where it is desired to form them into an aqueous composition for purposes of environmental protection, fire prevention and the like, a large amount of emulsifying agent is required because of their inadequate emulsifiability. This leads not only to a decrease in water resistance, drying properties, weather resistance and the like, but also to an economic disadvantage. Furthermore, these petroleum fraction waxes have adhesive properties which may result in poor removability as well as discoloration and/or loss in luster of the paint surfaces on automobiles.

The component (b) used in the composition of the present invention is an emulsifying agent selected from a wide variety of nonionic, cationic and anionic emulsifying agents in common use. Among others, cationic emulsifying agents are particularly effective in ionizing and activating the acid groups of the oxygen-containing wax. Typical examples of suitable cationic emulsifying agents include ammonia and amines such as triethylamine, triethanolamine, morpholine and the like. Among these cationic emulsifying agents, morpholine is preferred. In the case of nonionic emulsifying agents, they may be chosen so as to provide an HLB of 12 to 18 for the oxygen-containing wax. Typical examples of suitable nonionic emulsifying agents include Span 60, Span 80, Tween 60, Tween 80 and Emulgen 420 (all manufactured by Kao-Atlas Co., Ltd.). Where a cationic emulsifying agent is used, its effect can be enhanced by adding an anionic emulsifying agent (e.g., oleic acid) in an amount less than the equivalent amount of the cationic emulsifying agent.

The components (c) used in the composition of the present invention is a substantially white-colored powder of an inorganic material having a silicon content of not less than 23% by weight, and typical examples of suitable materials include white-, gray- or cream-colored fine powders of silica, clay, diatomaceous earth (calcined or uncalcined), talc, aluminum silicate, zeolite and mixtures thereof. Among these materials, silica having a silicon content of not less than approximately 34% by weight, diatomaceous earth having a silicon content of not less than approximately 34% by weight, and mixtures thereof are particularly preferred. The component (c) is used in an amount of 10 to 1,000 parts by weight, preferably 10 to 400 parts by weight and more preferably 50 to 200 parts by weight, per 100 parts by weight of the oxygen-containing wax. If the amount of component (c) used is less than the aforesaid range, the resulting composition has poor removability with warm water, while if it is greater than the aforesaid range, the resulting composition shows a decrease in protective power.

The substantially white-colored fine powders of inorganic materials which can suitably be used as the component (c) in the composition of the present invention all contain now less than 23% by weight of silicon, i.e. not less than approximately 50% by weight of silica ($SiO_2$). Silica is excellent in water resistance, heat resistance, weather resistance and chemical resistance and also resistant to acid rainwater, bird droppings and smoke. Moreover, the addition of silica results in a composition which can form a soft and smooth white coating characterized by good strippability and removability with hot water.

The component (d) used in the composition of the present invention is a white-colored fine powder of an inorganic or organic material substantially free of silicon, and typical examples of suitable materials include titanium oxide, zinc oxide, calcium carbonate, magnesium carbonate, barium carbonate, calcium sulfate, barium sulfate, calcium stearate, zinc stearate, polyethylene, polystyrene, polyfluoroethylene and mixtures thereof. Among these materials, titanium oxide, calcium carbonate, calcium sulfate, polyethylene and mixtures thereof are particularly preferred.

The component (d) is used in an amount of 10 to 200 parts by weight, preferably 20 to 100 parts by weight, per 100 parts by weight of the oxygen-containing wax. The weight ratio of the component (c) to the component (d) can range from 90:10 to 10:90 and preferably from 90:10 to 30:70. If the weight ratio of component (d) is too high, the resulting component exhibits good protective power at the expense of removability with warm water, while if that of component (c) is too high, the resulting composition exhibits good removability with warm water at the expense of protective power. The most satisfactory compromise between these properties is reached at a weight ratio ranging from 70:30 to 40:60.

Compositions comprising wax and solid powder are well known, but most of the compositions heretofore in common use are in the form of a dispersion of wax and solid powder in a solvent. Not all of the solid powders known in the prior art are useful in the preparation of a composition comprising a dispersion of wax and solid powder in water. As a result of thorough investigations, the present inventors have found that solid powders (in particular, silica and/or diatomaceous earth) falling under the category of the component (c) serve to significantly improve the removability with hot water of such a composition, whereas solid powders (e.g., titanium oxide, calcium carbonate and polyfluoroethylene) falling under the category of the component (d) rather degrade the removability with hot water. Nevertheless, a composition comprising a dispersion of wax and the component (c) in water fails to afford a sufficient degree of protection because weathering tests have revealed a poor state of the paint surface after removal of the protective coating. According to the present invention, it has been established that a desirable aqueous composition can be obtained only by the combined use of the components (c) and (d) in the above-defined proportion.

Thus, the composition of the present invention has been described in detail with reference to each of its essential components. In preparing the composition of the present invention, a suitable combination of materials falling under the categories of the components (a), (b), (c) and (d) is chosen and emulsified in water. This emulsification may be accomplished according to any well-known technique. However, it is preferable to use the components (a), (b), (c) and (d) in a combined amount of 5 to 65 parts by weight, preferably 10 to 45 parts by weight, per 100 parts by weight of water.

So long as its ability to afford a high degree of protection to paint surfaces is not impaired, the composition of the present invention may contain, in addition to the aforesaid essential components, petroleum fraction waxes such as paraffin wax, microcrystalline wax and unpurified paraffin waxes (e.g., slack wax, scale wax and the like) in an amount of not greater than 50% by weight based on the amount of the oxygen-containing wax. If desired, the composition of the present invention may also contain such additives as antioxidants, ultraviolet light absorbers, wax dispersants, thickeners and the like.

The aqueous composition of the present invention is useful in the protection of paint films and has the following unique features:

(1) Since it contains no solvent, the possibilities of environmental pollution and fire hazard are eliminated and, moreover, good economy is achieved by avoiding waste of resources.

(2) It is excellent in water resistance, heat resistance, weather resistance and drying properties.

(3) It can afford a high degree of protection to paint surfaces.

(4) It has a reasonable degree of strippability and, therefore, can readily be removed by means of a hot water cleaner.

Thus, the composition of the present invention is most suitable for the purpose of protecting the paint surfaces of automobiles and the like.

The present invention is further illustrated by the following examples and comparative examples.

EXAMPLE 1

(i) Synthesis of oxygen-containing wax (A)

A mixture of equal amounts of a petroleum fraction wax (I) and a polyolefin wax (II) was used as a starting material. The petroleum fraction wax was 125° F. paraffin wax (with a melting point of 52° C.) obtained by conventional petroleum refining procedure, and the polyolefin wax was a white waxy material consisting of a low polymer of ethylene and having a melting point of 39° C., a penetration of 80 or greater, an average molecular weight of 320, and 42 double bonds per 1,000 carbon atoms (including 88% of vinyl type unsaturation, 11% of vinylidene type unsaturation, and 4% of internal vinylene type unsaturation).

To 100 parts by weight of the above starting material was added 13 parts by weight of maleic anhydride. While the resulting mixture was being heated at 150° C. with stirring, a solution of 1 part by weight of di-tert-butyl peroxide in 5 parts by weight of xylene was added thereto. After the stirring was continued for an additional 30 minutes, the mixture was stripped of any volatile matter under reduced pressure and then filtered under pressure to obtain an oxygen-containing wax of a pale-yellow color. This oxygen-containing wax had a melting point of 52° C., a penetration of 20, an acid value of 90, a saponification value of 90, and an oxygen content of 6.5% by weight.

(ii) Emulsification of oxygen-containing wax (A)

While 10 g of the oxygen-containing wax (A) described in the above section (i) was being heated at 100° C. with stirring, 0.1 g of oleic acid and then 0.1 g of morpholine were added thereto. To the vigorously stirred mixture was slowly added 86 ml of water at 95° C. The resulting white, homogeneous emulsion was passed through a homogenizer (manufactured by Manton-Gaulin Co., Ltd.) under a pressure of 200 kg/cm² to obtain a well-dispersed white wax emulsion.

(iii) Preparation of an aqueous composition for the protection of paint surfaces Titanium oxide (Tipaque T-780, manufactured by Ishihara Snagyo Kaisha, Ltd.) and calcium carbonate (Hakuenka CC, manufactured by Shiraishi Calcium K.K.) were preliminarily dispersed in water to form a 50% paste containing them in a weight ratio of 5:1, and 12 g of this paste was added to 80 g of the wax emulsion described in the above section (ii). Then, 10 g of finely powdered silica (Silton R-2, manufactured by Mizusawa Chemicals Co., Ltd.) having a silicon content of 42.5% by weight was added thereto and the resulting mixture was stirred to form an aqueous composition. This composition had a viscosity of 20 centipoises (at 25° C.) and a specific gravity of approximately 1.0. It neither formed a precipitate nor showed a change in viscosity after being allowed to stand at room temperature for 2 weeks.

(iv) Evaluation of the aqueous composition for the protection of paint surfaces

Using the above composition, a protective coating was formed on test pieces and then evaluated according to a total of 8 test procedures for performance evaluation which will be described later. The results thus obtained are summarized in Table 1. This composition exhibited excellent performance in all of the performance evaluation tests for the strength of protective coating, removability, drying properties and the like.

EXAMPLE 2

(i) Synthesis of oxygen-containing wax (B)

Eighty parts by weight of maleic anhydride and 50 parts by weight of mixed xylene were added to 200 parts by weight of a polyolefin wax having a melting point of 82° C., a penetration of 46, an average molecular weight of 475, and 23 double bonds per 1,000 carbon atoms. The resulting mixture was stirred at 230° C. for 4 hours. Thereafter, the mixture was distilled at 140° C. under a pressure of 30 mmHg to obtain a waxy material of a pale-yellow material. This oxygen-containing wax had a melting point of 82° C., a saponification value of 91, a penetration of 13, and an oxygen content of 6.0% by weight.

(ii) Emulsification of oxygen-containing wax (B)

The above oxygen-containing wax (B) was emulsified according to the procedure described in the section (ii) of Example 1.

(iii) Preparation and evaluation of an aqueous composition for the protection of paint surfaces An aqueous composition was prepared and evaluated according to the procedures described in the sections (iii) and (iv) of Example 1.

EXAMPLES 3 TO 12

Oxygen-containing wax emulsions were formed according to the procedures described in the sections (i) and (ii) of Examples 1 and 2. In Example 7, however, triethanolamine was used as an emulsifying agent in place of morpholine. Then, a number of aqueous compositions for the protection of paint surfaces were prepared by adding to the emulsions the components (c) and (d) comprising the respective materials shown in Table 1. These compositions were evaluated according to the test procedures which will be described later. The results thus obtained are summarized in Table 1. All the compositions exhibited excellent performance similarly to those of Examples 1 and 2.

EXAMPLES 13 AND 14

In Examples 13 and 14, beeswax (with an oxygen content of 3.6% by weight and a melting point of 61° C.) and oxidized paraffin wax (with an oxygen content of 4.0% by weight and a melting point of 57° C.) were respectively emulsified according to the procedure described in the section (ii) of Example 1. Then, according to the procedure described in the section (iii) of Example 1, two aqueous compositions for the protection of paint films were prepared by adding to the emulsions the components (c) and (d) comprising the respective materials shown in Table 1. Both compositions exhibited excellent performance similarly to those of Examples 1 to 12.

TABLE 1

| | Example No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Composition (parts by weight) | | | | | | | | | | | | | | |
| (a) | | | | | | | | | | | | | | |
| Oxygen-containing wax (A) | 8.3 | | 20.0 | 10.0 | 8.0 | 8.0 | 8.0 | 5.0 | 4.0 | 8.0 | 8.0 | | | |
| Oxygen-containing wax (B) | | 8.3 | | | | | | | | | | 8.0 | | |
| Beeswax | | | | | | | | | | | | | 8.0 | |
| Oxidized paraffin wax | | | | | | | | | | | | | | 8.0 |
| (b) | | | | | | | | | | | | | | |
| Morpholine | 0.08 | 0.08 | 0.20 | 0.10 | 0.08 | 0.08 | | 0.05 | 0.04 | 0.08 | 0.08 | 0.08 | 0.08 | 0.08 |
| Triethanolamine | | | | | | | 0.08 | | | | | | | |
| Oleic acid | 0.08 | 0.08 | 0.20 | 0.10 | 0.08 | 0.08 | 0.08 | 0.05 | 0.04 | 0.08 | 0.08 | 0.08 | 0.08 | 0.08 |
| (c) | | | | | | | | | | | | | | |
| Silica (with an Si content of 42.5% by weight) | 10.0 | 10.0 | 5.0 | 10.0 | 12.0 | 12.0 | 12.0 | | | | 6.0 | 12.0 | 12.0 | 12.0 |
| Diatomaceous earth (with an Si content of 41.7% by weight) | | | | | | | | 25.0 | 28.0 | 12.0 | 6.0 | | | |
| (d) | | | | | | | | | | | | | | |
| Titanium oxide | 5.0 | 5.0 | 5.0 | 10.0 | 5.0 | 5.0 | 5.0 | 5.0 | 4.0 | 5.0 | 5.0 | 5.0 | 5.0 | 5.0 |
| Calcium carbonate | 1.0 | 1.0 | | | 1.0 | 1.0 | 1.0 | 1.0 | 1.0 | 1.0 | 1.0 | 1.0 | 1.0 | 1.0 |
| Water | 77.5 | 77.5 | 64.9 | 67.4 | 73.3 | 72.3 | 73.8 | 63.9 | 62.9 | 72.3 | 72.3 | 72.3 | 72.3 | 72.3 |
| Performance Evaluation Tests | | | | | | | | | | | | | | |
| (1) Appearance of protective coating | White, smooth | White, smooth | White, smooth | White, smooth | White, smooth | White, smooth | White, smooth | White, smooth | White, smooth | White, smooth | White, smooth | White, smooth | White, smooth | White, smooth |
| (2) Heat resistance | ○ | ○ | ○ | ○ | ○ | ○ | ○ | ○ | ○ | ○ | ○ | ○ | ○ | ○ |
| (3) Water resistance | ○ | ○ | ○ | ○ | ○ | ○ | ○ | ○ | ○ | ○ | ○ | ○ | ○ | ○ |
| (4) Accelerated weathering test | | | | | | | | | | | | | | |
| - Removability | ○ | △ | △ | △ | ◎ | ◎ | ◎ | ○ | ○ | ◎ | ◎ | ○ | ○ | ○ |
| - Paint Surface | ○ | ○ | ○ | ○ | ○ | ○ | ○ | ○ | ○ | ○ | ○ | ○ | ○ | ○ |

TABLE 1-continued

| | Example No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| (5) Outdoor weathering test - Removability | ○ | ○ | △ | ○ | ◎ | ◎ | ◎ | ○ | ○ | ◎ | ◎ | ○ | ○ | ○ |
| (6) Protection against iron dust | ○ | △ | ○ | ○ | ○ | ○ | ○ | ○ | ○ | ○ | ○ | ○ | ○ | ○ |
| (7) Protection against 6% $H_2SO_4$ | ○ | ○ | ○ | ○ | ○ | ○ | ○ | △ | △ | ○ | ○ | ○ | ○ | ○ |
| (8) Drying properties | ○ | ○ | ○ | ○ | ○ | ○ | ○ | ○ | ○ | ○ | ○ | ○ | ○ | ○ |

COMPARATIVE EXAMPLES 1 TO 7

As shown in Table 2, Comparative Example 1 illustrates an aqueous composition prepared by emulsifying the aforesaid oxygen-containing wax (A) according to the procedure described in the section (ii) of Example 1. The oxygen-containing wax, which was within the scope of the present invention, had good emulsifiability. Since neither the component (c) nor the component (d) was present, this composition exhibited good removability in the accelerated weathering test, but resulted in a poor state of the paint surface after removal of the protective coating. Moreover, its removability in the outdoor weathering test, heat resistance and drying properties were unsatisfactory.

Comparative Examples 2 and 3 illustrate aqueous compositions prepared by emulsifying the aforesaid oxygen-containing wax (A) according to the procedure described in the section (ii) of Example 1 and then adding titanium oxide as the component (d) according to the procedure described in the section (iii) of Example 1. For the composition of Comparative Example 2 which contained a large amount of titanium oxide, good heat resistance and drying properties were achieved, but poor removability was observed in the accelerated and outdoor weathering tests. For the composition of Comparative Example 3 which contained a small amount of titanium oxide, good protective power was achieved, but poor removability was observed in the accelerated and outdoor weathering tests.

Comparative Example 4 illustrates an aqueous composition containing a large amount of calcium carbonate as the component (d). Good heat resistance and protective power were achieved, but poor removability was observed in both weathering tests.

Comparative Example 5 illustrates an aqueous composition prepared from paraffin wax. A large amount, or 10 parts by weight per 100 parts by weight of the wax, of emulsifying agent (a mixture of equal amounts of Tween 80 and Span 80) was required because of the inadequate emulsifiability of the wax. Accordingly, this composition was poor in water resistance, drying properties and heat resistance.

Comparative Example 6 illustrates an aqueous composition prepared from oxidized polyethylene wax (with a melting point of 108° C. and an oxygen content of 4.4% by weight). Good heat resistance was achieved owing to the high melting point of the wax, but poor removability was observed in both weathering tests.

Comparative Example 7 illustrates an aqueous composition in which hard clay having a silicon content of 18% by weight was used in place of the silica. Good heat resistance was achieved, but poor removability was observed in both weathering tests.

TABLE 2

| | Comparative Example No. | | | | | | |
|---|---|---|---|---|---|---|---|
| | 1 | 2 | 3 | 4 | 5 | 6 | 7 |
| Composition (parts by weight) | | | | | | | |
| (a) | | | | | | | |
| Oxygen-containing wax (A) | 20.0 | 8.0 | 16.0 | 8.0 | | | 8.0 |
| Paraffin wax | | | | | 8.0 | | |
| Oxidized polyethylene wax | | | | | | 8.0 | |
| (b) | | | | | | | |
| Morpholine | 0.20 | 0.08 | 0.16 | 0.08 | | 0.10 | 0.08 |
| Oleic acid | 0.20 | 0.08 | 0.16 | 0.08 | | 0.10 | 0.08 |
| Mixture of equal amounts of Tween 80 and Span 80 | | | | | 0.08 | | |
| (c) | | | | | | | |
| Silica (with an Si content of 42.5% by weight) | | | | | 12.0 | 12.0 | |
| Hard clay (with an Si content of 18% by weight) | | | | | | | 12.0 |
| (d) | | | | | | | |
| Titanium oxide | | 16.0 | 8.0 | | 5.0 | 5.0 | 5.0 |
| Calcium carbonate | | | | 16.0 | | | |
| Water | 74.9 | 74.4 | 72.8 | 74.4 | 73.1 | 72.8 | 73.4 |
| Performance Evaluation Tests | | | | | | | |

TABLE 2-continued

|  | Comparative Example No. | | | | | | |
| --- | --- | --- | --- | --- | --- | --- | --- |
|  | 1 | 2 | 3 | 4 | 5 | 6 | 7 |
| (1) Appearance of protective coating | Translucent, smooth | White, smooth | White, smooth | White, smooth | White, smooth | White, smooth | White, smooth |
| (2) Heat resistance | X | ○ | ○ | ○ | X | ◎ | ◎ |
| (3) Water resistance | ○ | ○ | ○ | ○ | X | ○ | ○ |
| (4) Accelerated weathering test | | | | | | | |
| - Removability | ○ | X | X | X | Δ | X | X |
| - Paint surface | X | X | ○ | X | Δ | X | X |
| (5) Outdoor weathering test | | | | | | | |
| - Removability | X | X | X | X | Δ | X | X |
| (6) Protection against iron dust | ○ | ○ | ○ | ○ | ○ | ○ | ○ |
| (7) Protection against 6% H$_2$SO$_4$ | ○ | ○ | ○ | ○ | ○ | ○ | ○ |
| (8) Drying properties | X | ○ | X | Δ | X | X | X |

Procedures for Performance Evaluation (Coating Procedure)

Test pieces were prepared by baking a black-pigmented amino-alkyd resin on 150 mm×70 mm mild steel plates (1 mm thick). An emulsion was sprayed onto the test pieces through a nozzle and then dried by allowing the coated test pieces to stand at room temperature for 24 hours. When calculated from the increase in weight, the average thickness of the resulting protective coating was found to be 15μ.

(Test Procedures)

(1) Appearance of protective coating
See tables 1 and 2.

(2) Test for heat resistance

A test piece was placed vertically in a thermostatic chamber and allowed to stand at 80° C. for 96 hours. Then, the protective coating was examined for sags and runs, cracks and other changes. Next, the test piece was washed with hot water and a kitchen detergent to remove the protective coating, and then wiped with gauze. Thereafter, the painted surface was examined for loss in luster, swelling and other changes. The results were rated on the following basis: ○ =no change; Δ=slight change; X=considerable change.

(3) Test for water resistance

A test piece was immersed in pure water kept at 40° C. and allowed to remain for 240 hours. Then, both the protective coating and the paint surface after removal of the protective coating were examined for swelling, peeling and other changes. The results were rated in the same manner as in the test for heat resistance.

(4) Accelerated weathering test

[Paint surface]

A test piece was placed in a Sunshine Weather Meter (manufactured by Toyo Rika Kogyo K.K.) and allowed to stand at 63° C. for 250 hours. During this period, cold water was poured over the test piece for 18 minutes at intervals of 2 hours. Then, both the protective coating and the paint surface after removal of the protective coating were examined for stains, spots, loss in luster, and other changes. The results were rated in the same manner as in the test for heat resistance.

[Removability]

A nozzle having an orifice diameter of approximately 3 mm was positioned approximately 50 mm away from a test piece. Through this nozzle, steam having a pressure of 1 kg/cm$^2$G was sprayed onto the test piece for 10 seconds. Then, the diameter of the circular area from which the protective coating had been removed was measured. The results were rated on the following basis: ⊚=20 mm or greater; ○=15 to 20 mm; Δ=8 to 15 mm; X=less than 8 mm.

(5) Outdoor weathering test

A test piece was exposed to outdoor conditions for one month during the summer season. Then, the protective coating was tested for removability according to the procedure of the accelerated weathering test. The results were rated in the same manner as in the accelerated weathering test. (In addition, an automobile door was coated with an aqueous composition of the present invention and exposed to outdoor conditions for 3 months. Thereafter, the protective coating could readily be removed by means of a hot water cleaner.)

(6) Test for protection against iron dust

An ample amount of iron dust was sprinkled over the protective coating of a test piece, which was then dried at 80° C. for 5 hours in a thermostatic chamber and then allowed to stand at room temperature for one hour. Thereafter, the test piece was subjected to a salt spray test for 24 hours according to the procedure described in JIS No. Z2371 and then allowed to stand for 24 hours. After the test piece was washed with hot water and a detergent to remove the iron dust and the protective coating, the painted surface was examined for rust formation and damage by iron dust. The results were rated on the following basis: ○=no rust formation; Δ=slight rust formation X=appreciable rust formation.

(7) Test for protection against sulfuric acid

The protective coating of a test piece was spotted with 0.1 ml of 6% sulfuric acid and allowed to stand at room temperature for 24 hours Δ=slightly shorter or longer than 3 minutes drying time when the test is repeated. Thereafter, the test piece was washed with hot water and a detergent to remove the protective coating. The painted surface was air-dried and examined for discolored traces and attack by sulfuric acid. The results were rated on the following basis: ○=no discolored traces; Δ=slightly discolored traces; X=clearly discolored traces.

(8) Test for drying properties

Using a glass spray nozzle, an emulsion was sprayed onto a test piece. Immediately after that, the coated test piece was placed in a tunnel-shaped drying oven having a diameter of 10 cm and a length of 20 cm, through which air was passed by means of a dryer to dry the protective coating at room temperature and an air flow velocity of approximately 4 m/sec. Thereafter, a spray of water from a nozzle connected to a water faucet was poured over the test piece. The drying time was defined as the minimum time at which neither swelling nor peeling of the protective coating was observed. The results were rated on the following basis: ◯=within 3 minutes; X=3 minutes or more.

What is claimed is:

1. An aqueous composition for the protection of paint surfaces which comprises an aqueous emulsion containing as essential components
    (a) 100 parts by weight of an oxygen-containing wax having an oxygen content of not less than 3.0% by weight and a melting point of 50° to 85° C.,
    (b) less than 7 parts by weight of an emulsifying agent,
    (c) 10 to 1,000 parts by weight of a substantially white-colored fine powder of an inorganic material having a silicon content of not less than 23% by weight, and
    (d) 10 to 200 parts by weight of a white-colored fine powder of an inorganic or organic material substantially free of silicon.

2. A composition as claimed in claim 1 wherein the oxygen-containing wax comprises one or more members selected from the group consisting of natural waxes such as carnauba wax, montan wax, rice bran wax, beeswax and Japan wax; synthetic waxes such as oxidized microcrystalline wax and oxidized paraffin wax; the products obtained by further modifying the foregoing waxes through various reactions; and mixtures thereof.

3. A composition as claimed in claim 1 wherein the oxygen-containing wax is a product obtained by the reaction of a hydrocarbon wax having a melting point of 50° to 85° C. with an unsaturated polycarboxylic acid or an anhydride thereof.

4. A composition as claimed in claim 1 wherein the oxygen-containing wax is a product obtained by the reaction of a hydrocarbon wax having a melting point of 50° to 80° C. and a polyolefin wax having a melting point of 36° to 120° C., a number-average molecular weight of 310 to 1,000, and 5 to 50 double bonds per 1,000 carbon atoms, with an unsaturated polycarboxylic acid or an anhydride thereof.

5. A composition as claimed in claim 1 wherein the emulsifying agent is a cationic emulsifying agent.

6. A composition as claimed in claim 1 wherein the emulsifying agent is a mixture of a cationic and an anionic emulsifying agent, the amount of the anionic emulsifying agent being less than the equivalent amount of the cationic emulsifying agent.

7. A composition as claimed in claim 1 wherein the emulsifying agent is present in an amount of 0.5 to 5 parts by weight per 100 parts by weight of the oxygen-containing wax.

8. A composition as claimed in claim 1 wherein the component (c) is selected from the group consisting of white-, gray- or cream-colored fine powders of silica, clay, diatomaceous earth, talc, aluminum silicate, zeolite and mixtures thereof.

9. A composition as claimed in claim 1 wherein the component (c) is selected from the group consisting of silica having a silicon content of not less than approximately 34% by weight, diatomaceous earth having a silicon content of not less than approximately 34% by weight, and mixtures thereof.

10. A composition as claimed in claim 1 wherein the component (c) is present in an amount of 10 to 400 parts by weight per 100 parts by weight of the oxygen-containing wax.

11. A composition as claimed in claim 10 wherein the component (c) is present in an amount of 50 to 200 parts by weight per 100 parts by weight of the oxygen-containing wax.

12. A composition as claimed in claim 1 wherein the component (d) is selected from the group consisting of titanium oxide, zinc oxide, calcium carbonate, magnesium carbonate, barium carbonate, calcium sulfate, barium sulfate, calcium stearate, zinc stearate, polyethylene, polystyrene, polyfluoroethylene and mixtures thereof.

13. A composition as claimed in claim 12 wherein the component (d) is selected from the group consisting of titanium oxide, calcium carbonate, calcium sulfate, polyethylene and mixtures thereof.

14. A composition as claimed in claim 1 wherein the component (d) is present in an amount of 20 to 100 parts by weight per 100 parts by weight of the oxygen-containing wax.

15. A composition as claimed in claim 1 wherein the weight ratio of the component (c) to the component (d) ranges from 90:10 to 30:70.

16. A composition as claimed in claim 15 wherein the weight ratio of the component (c) to the component (d) ranges from 70:30 to 40:60.

17. A composition as claimed in claim 1 wherein the components (a), (b), (c) and (d) are present in a combined amount of 5 to 65 parts by weight per 100 parts by weight of water.

18. An aqueous composition for the protection of paint surfaces which comprises an aqueous emulsion containing as essential components
    (a) 100 parts by weight of an oxygen-containing wax having an oxygen content of not less than 3.0% by weight and a melting point of 50° to 85° C.,
    (b) less than 7 parts by weight of an emulsifying gent,
    (c) 10 to 1,000 parts by weight of a substantially white-colored fine powder of an inorganic material having a silicon content of not less than 23% by weight, and
    (d) 10 to 200 parts by weight of a white-colored fine powder of an inorganic material substantially free of silicon.

19. Composition of claim 18 wherein the component (d) is selected from the group consisting of titanium dioxide, zinc oxide, calcium carbonate, magnesium carbonate, barium carbonate, calcium sulfate, barium sulfate and mixtures thereof.

20. Composition of claim 18, wherein the component (c) has a silicon content of not less than approximately 34% by weight.

21. Method for the protection of a painted surface which comprises applying the composition of claim 1 to the painted surface to form a protective coating thereon.

22. Method for the temporary protection of a painted surface which comprises applying the composition of claim 1 to the painted surface to form a protective coating thereon, and after a temporary period of protection then applying hot water or steam to the coating for substantially removing the coating thereby.

23. Method of claim 22 wherein the hot water or steam contains a detergent.

* * * * *